United States Patent [19]

Komamura et al.

[11] 4,047,846
[45] Sept. 13, 1977

[54] POWER-STEERING PUMP

[75] Inventors: Seiji Komamura; Hiroyuki Hashizume, both of Gifu, Japan

[73] Assignee: Kayabakogyokabushikikaisha, Tokyo, Japan

[21] Appl. No.: 687,556

[22] Filed: May 18, 1976

[30] Foreign Application Priority Data

May 19, 1975 Japan .............................. 50-66972[U]

[51] Int. Cl.² ............................................. F04B 49/08
[52] U.S. Cl. .................................................... 417/300
[58] Field of Search ...................... 417/300, 307, 310; 180/79.2 R

[56] References Cited

U.S. PATENT DOCUMENTS

| | | | |
|---|---|---|---|
| 3,349,714 | 10/1967 | Grenier | 417/300 |
| 3,403,630 | 10/1968 | Clark et al. | 417/300 |
| 3,656,870 | 4/1972 | Kusakabe et al. | 417/300 |
| 3,752,601 | 8/1973 | Karagozian et al. | 417/300 |

Primary Examiner—Carlton R. Croyle
Assistant Examiner—Gregory P. LaPointe
Attorney, Agent, or Firm—Saul Jecies

[57] ABSTRACT

The present invention discloses a power-steering pump which may reduce in a very stable manner the flow rate of the hydraulic liquid under pressure to be delivered to a power steering system with increase of the rotational speed of an engine beyond an idling speed and which may easily change the above rate reduction or attenuation characteristic depending upon the types of the automotive vehicles and power steering systems thereof. A flow-control valve which is disposed in parallel with the axis of a pump mechanism is provided with a variable-area orifice which determines the flow rate attenuation characteristic and which is defined by an orifice groove cut through a flange of a partition wall member and an enlarged-diameter portion at the free end of a control rod extended through the partition wall member from the front end of a control spool of the flow-control valve. The flow-control valve is so arranged as to be freely detached from the pump independently of the pump mechanism so that a partition wall member having a suitable orifice groove may be placed, thereby changing the flow-rate attenuation characteristic as needs demand.

8 Claims, 8 Drawing Figures

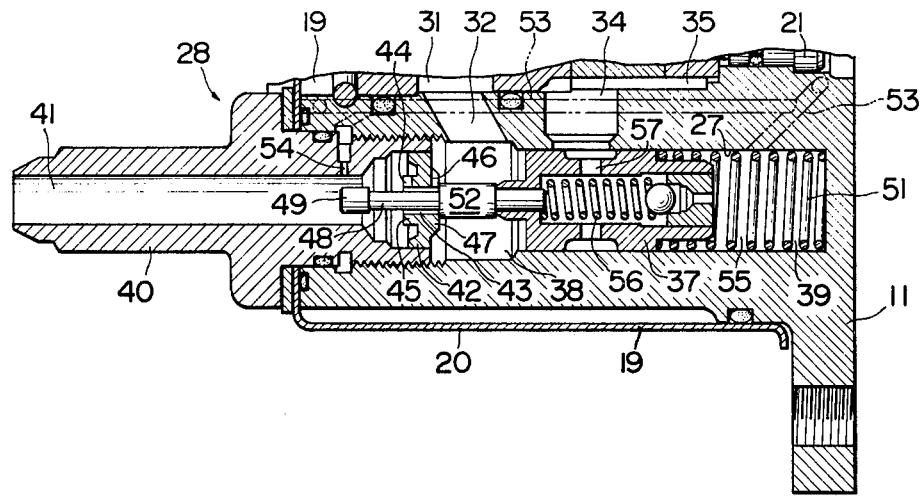
FIG. 3
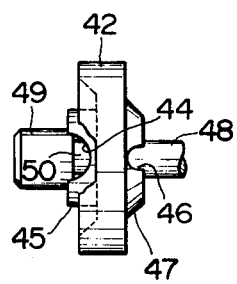 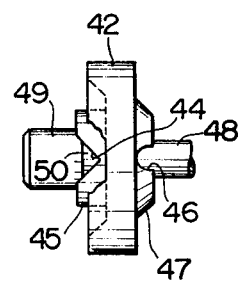 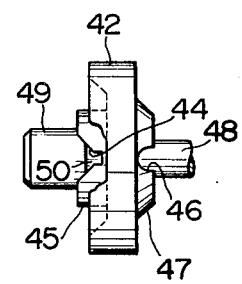 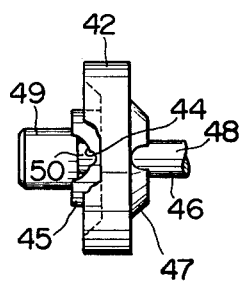
FIG. 4A  FIG. 4B  FIG. 4C  FIG. 4D
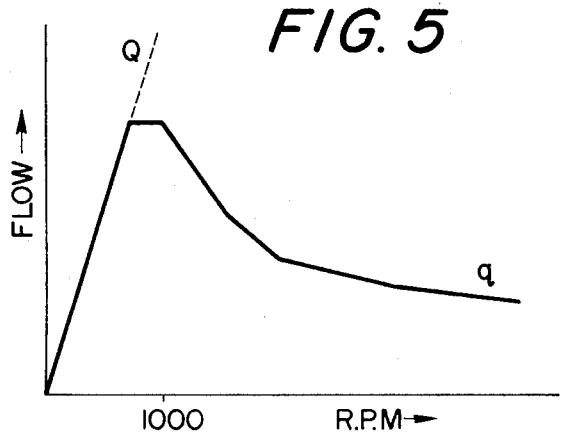
FIG. 5

POWER-STEERING PUMP

BACKGROUND OF THE INVENTION

The present invention relates to generally a power steering system for an automotive vehicle and more particularly a power-steering pump including a flow-control valve which may attain very stable flow rate attenuation characteristic, that is, the ability of reducing the flow rate of the hydraulic liquid under pressure to be delivered from a pump mechanism to a power steering system with increase in rotational speed of an engine, whereby the hydraulic liquid under pressure may be delivered at an optimum flow rate into the power steering system depending upon the operating conditions or speed of the engine.

In the power steering systems, the required hydraulic liquid under pressure is provided, in general, by a pump drivingly coupled to an engine so that the discharge from the power-steering pump changes as a function of the rotational speed of the engine. The slower the speed of the vehicle, the higher the steering load or resistance encountered becomes, and the steering resistance becomes the maximum during parking when the engine is idling or when the rotational speed of the engine is lowest. Therefore the power steering system is provided with a flowcontrol valve so that (1) the hydraulic liquid under pressure flows from the pump to the steering system at the maximum flow rate during parking in order to permit the easy steering and (2) the difference between the flow rate controlled by the flow-control valve and the flow rate when the rotational speed of the engine is high may be minimized. However, in practice the steering resistance during high speeds is considerably reduced than during parking so that there is a considerable difference between the flow rates during high speeds and parking. As a result, the safety in steering is adversely affected, and the undesirable heat evolution occurs.

To overcome these problems, the flow-control valves must have such flow-rate attenuation characteristic that the flow rate of the hydraulic liquid under pressure to be delivered to the power steering system may be reduced with decrease in steering resistance resulting from the increase in speed. The power-steering pump based upon the above principle is disclosed in U.S. Pat. No. 3,349,714, granted to Emile P. Grenier, Oct. 31, 1967. This pump utilizes the function of the control spool of a flow-control valve that it maintains the flow rate constant depending upon the increase or decrease in discharge from an oil pump. That is, a metering rod which is attached to the control spool is extended through a detecting orifice with a clearance there between so that the opening area of the orifice may be varied by the displacement of the metering rod. Therefore the gain of the flow-control valve is varied depending upon the rotational speed of the engine. However, the flow rate controllability of this flow-control valve is adversely affected by the dimensional errors of the metering rod and the misalignment of the metering rod with the orifice during assembly. Therefore they must be machined, finished and assembled with a higher degree of accuracy with the resultant increase in number of fabrication and assembly steps. In addition, there is another defect that since the flow-control valve with the metering rod is assembled as a unitary construction with the power-steering pump, it cannot be removed from the pump without disassembling the pump itself.

As a result, the flow rate attenuation characteristic cannot be readily changed depending upon the types of the automotive vehicles and power steering systems.

SUMMARY OF THE INVENTION

In view of the above, one of the objects of the present invention is to provide a power-steering pump in which a flow-control valve may be readily detached from the pump without disassembling the pump mechanism so that a suitable element for determining the flow-rate attenuation characteristic of the flow-control valve may be changed in a very simple manner.

Another object of the present invention is to provide a powersteering pump provided with an improved flow rate attenuation mechanism which may be easily fabricated and assembled and which may exhibit very stable flow rate attenuation characteristic.

To the above and other ends, the present invention provides a power-steering pump in which a flow-control valve is disposed in parallel with the axis of a pump mechanism in such a way that the flow-control valve may be detached from the pump independently of the pump mechanism; a partition wall member with a central hole is placed within the flow-control valve forwardly of a control spool thereof and is provided with a flange extended coaxially of the central hole and provided with a radial orifice groove; the free end of a control rod which is extended from the front end of the control spool through the central hole of the partition wall member is terminated into an enlarged-diameter portion which mates with the central hole, whereby a variable-area orifice may be defined by the enlarged-diameter portion of the control rod and the radial orifice groove of the flange of the partition wall member. Therefore the opening area of the variable-area orifice may be varied depending upon the displacement or stroke of the control rod so that the flow rate may be suitably reduced in response to the increase in rotational speed of the engine. One of the most important advantages of the present invention therefore resides in the fact that the dimensional errors of the central hole of the partition wall member and the enlarged-diameter portion of the control rod and the misalignment therebetween will not adversely affect the flow-rate attenuation characteristic of the flow-control valve. Another important advantage is that various types of partition wall members with radial orifice grooves in various configurations may be prepared and any of them may be inserted into the flow-control valve without disassembling the pump mechanism so that any desired flowrate attenuation characteristic may be obtained in a very simple manner.

The above and other objects, features and advantages of the present invention will become more apparent from the following description of one preferred embodiment thereof taken in conjunction with the accompanying drawings.

BRIEF DESCRIPTION OF THE DRAWINGS

FIG. 3 is a longitudinal sectional view, on enlarged scale, of a flow-control valve;

FIGS. 4A, 4B, 4C and 4D are schematic views illustrating partition wall members with radial orifice grooves in various configurations each of which may be selectively inserted into the flow-control valve; and FIG. 5 is a graph illustrating the relationship between the flow rate and the rotational speed of an engine.

DESCRIPTION OF THE PREFERRED EMBODIMENT

Figure 1:
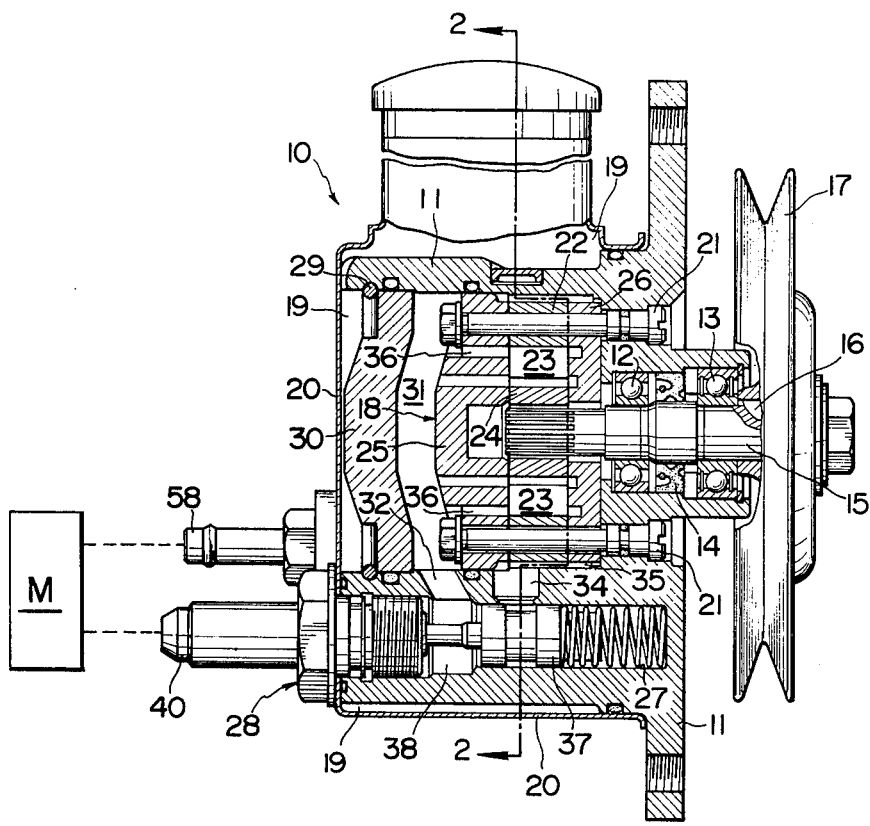
FIG. 1 is a longitudinal sectional view of one preferred embodiment of a power-steering pump in accordance with the present invention.

In FIG. 1 there is shown in longitudinal cross section one preferred embodiment of a power-steering pump 10 in accordance with the present invention. The pump 10 has a drive shaft 15 rotatively supported in housing 11 by ball bearings 12 and 13 with an oil seal 14 interposed concentrically therebetween. A pulley 17 which is keyed with a key 16 to the drive shaft 15 is drivingly coupled to an engine (not shown) so that the drive shaft 15 may be driven at a rotational speed in proportion to that of the engine. The casing 11 houses therein a pump mechanism 18 driven by the drive shaft 15, and is surrounded by a pump cover 20 which defines an oil reservoir 19.

Figure 2:
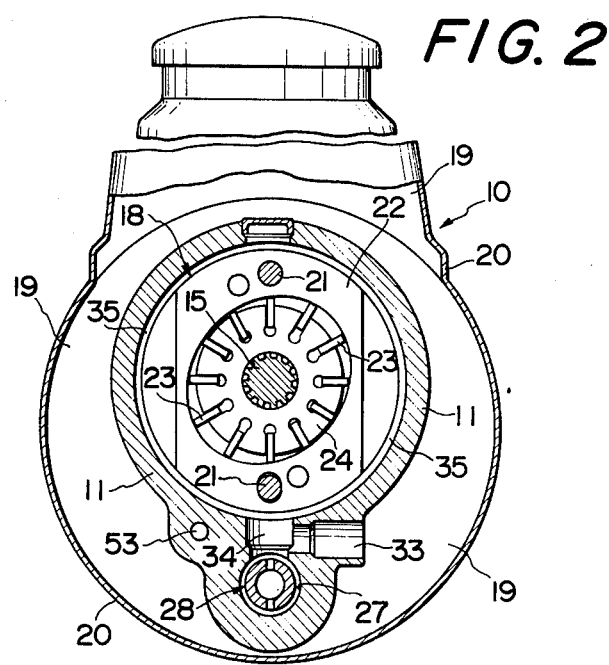
FIG. 2 is a sectional view taken along the line 2—2 of FIG. 1.

The detailed description of the construction of the pump mechanism 18 will not be required for the full understanding of the present invention. As shown in FIGS. 1 and 2, the pump mechanism 18 may be of the conventional type in which a rotor 24 having a plurality of radially slidable vanes 23 rotates in the bore of a cam ring 22 securely attached to the casing 11 with knock pins 21. Alternatively, it may be of the slipper-type used in the power-steering pump disclosed in the above U.S. Pat. No. 3,349,714. The pump mechanism 18 therefore includes side plates 25 and 26 which hold the cam ring 22 in position and other mechanical parts.

For the understanding of the present invention, however, it should be noted that the housing 11 has a valve bore 27 formed in the lower portion thereof in parallel with the axis of the pump mechanism 18 as best shown in FIG. 1, and that a flow-control valve 28 is detachbly fitted into the valve bore 27 through the opening thereof. More particularly, a partition wall member 30 is placed in the housing in opposed relationship with the front side of the pump mechanism 18 and is securely held in position by a retaining ring 29 in such a way that the partition wall member 30 defines within the casing 11 a pressure chamber 31 independent from the oil reservoir 19 but in communication with the flow-control valve 28 through an inlet port 32.

When the rotor 24 of the pump mechanism 18 is driven, the hydraulic liquid oil in the oil reservoir 19 is forced to flow into the pump mechanism 18 through a passage 33 formed through the casing 11 (See FIG. 2) and a bypass port 34 of the flow-control valve 28 and a space 35 between the housing 11 and the pump mechanism 18, and the hydraulic liquid oil under pressure is delivered through a discharge port 36 formed through the side plate 25, the pressure chamber 31 and the inlet port 32 into the flow-control valve 28.

Next referring particularly to FIG. 3, the flow-control valve 28, which is one of the most essential parts of the power steering pump in accordance with the present invention will be described in detail. The inlet port 32 and the bypass port 34 described above are opened into the valve bore 27 into which is slidably fitted a control spool 37 which is stroked to close or open the bypass port 34 as will be described in more detail hereinafter. The valve bore 27 is divided into a front chamber 38 and a rear chamber 39 by the control spool 37. The intake port 32 is normally opened to or communicated with the front chamber 38. Therefore when the control spool 37 is displaced to the right to open the bypass port 34, the inlet port 32 is communicated with the bypass port 34. A nipple 40 is screwed into the left-side opening of the valve bore 27, and serves as an outlet port 41 for delivering the hydraulic liquid under pressure from the pump mechanism 18 to a diagrammatically shown power steering system M. A partition wall member 42 is detachably placed at the inner end of the nipple 40 in opposed relation with the control spool 37. The partition wall member 42 is formed with a central passage hole 43. A flange 45 formed with an orifice groove 44 and a flange or extension 47 formed with a radial groove 46 are extended outwardly from the partition wall member 42 in opposite directions and concentrically of the center passage hole 43. A control rod 48 is extended from the front end of the control spool 37 through the central passage hole 43 of the partition wall member 42 and has a free end terminated into an enlarged diameter portion 49 which mates with the central passage hole 43 of the partition wall member 42. When the control spool 37 is displaced to the right, the enlarged-diameter portion 49 gradually closes the orifice groove 44 of the flange 45 of the partition wall member 42 so that a variable-area orifice 50 (See FIG. 4) is defined between the orifice groove 44 and the enlarged-diameter portion 49. The opening of the orifice 50 varies depending upon the position of the control spool 37, and the variable-area orifice 50 is defined in the passage of the hydraulic liquid flowing from the inlet port 32 to the discharge port 41. As a result when the hydraulic fluid which has flowed into the front chamber 38 from the inlet port 32 flows through the variable-area orifice 50 to the discharge or outlet port 41, the pressure difference across the variable-area orifice 50 is proportional to the square of the opening area of the orifice 50 as well as the square of the flow rate.

A coiled spring 51 is loaded between the rear end of the control spool 37 and the bottom of the valve bore 37 so that an enlarged-diameter portion or collar 52 formed at the base portion of the control rod 48 is normally pressed against the flange or extension 47 of the partition wall member 42 and consequently the opening area of the variable-area orifice 50 is maintained maximum and the bypass port 34 is kept closed. However when the control spool 37 is further displaced to the right against the coiled spring 51 from the position described above, the bypass port 34 is opened so that a portion of the hydraulic liquid which has flown into the front chamber 38 through the inlet port 32 is returned to the space 35 on the suction side of the pump mechanism 18. At the same time the enlarged-diameter portion 49 of the control rod 38 gradually closes the orifice groove 44 of the flange 45 of the partition wall member 42 so that the opening area of the variable-area orifice 50 is reduced accordingly.

The rear chamber 39 behind the control spool 37 is communicated with the outlet port 41 through a passage 53 formed in the casing 11 and a reduced or restriction opening 54 so that the pressure at the upstream of the variable-area orifice 50 acts upon the front end of the control spool 37 which the pressure at the downstream of the orifice 50 acts upon the rear end of the control spool 37 through the port 54 and the passage 53.

The control spool 37 incorporates a relief valve 55 loaded with a coiled spring 56. When the load on the power steering system or unit 15 abnormally increased so that the pressure of the hydraulic liquid delivered from the discharge port 41 rises above a predetermined level, the relieve valve 55 is opened against the coiled spring 56 so that the rear chamber 39 is communicated with the bypass port 34 through a radial opening 57 formed through the control spool 37. As a result, the restriction port 54 functions so as to cause the rapid decrease in hydraulic pressure in the rear chamber 39 so that the control spool 37 is displaced further to the right. Consequently the bypass port 34 is opened wide so that the pressure of the hydraulic liquid to be delivered from the outlet port 41 to the power steering system may be reduced.

Next the mode of operation of the power-steering pump 10 with the above construction will be described in detail hereinafter. When the engine is started, the rotor 24 of the pump mechanism 18 is driven. The pump mechanism 18 sucks the hydraulic fluid in the reservoir 19 through the passage 33, the bypass port 34 and the space 35, and delivers the hydraulic liquid under pressure through the discharge port 36 into the pressure chamber 31. The hydraulic liquid under pressure flows from the pressure chamber 31 through the inlet port 32 into the front chamber 38 in the flow-control valve 28, and then flows into the power steering system through the space between the center passage hole 43 of the partition wall member 42 and the control rod 48 and the outlet port 41. The hydraulic liquid from the power steering system is returned into the oil reservoir 19 through a nipple 58 (See FIG. 1) extended through the pump cover 20.

When the hydraulic liquid under pressure is delivered to the power steering system from the pump mechanism 18 in the manner described above, the pressure difference is produced across the partition wall member 42 because the hydraulic liquid under pressure must flow through the orifice defined between the central passage hole 43 of the partition wall member 42 and the control rod 48 extending through the hole 43. The pressure at the upstream of the partition wall member 42; that is, the pressure in the front chamber 38 is transmitted to and acts on the front end of the control spool 37 while the pressure at the downstream of the partition wall member 42, that is, the pressure of the hydraulic liquid at the outlet port 41 is transmitted through the restriction port 54 and the passage 53, acting upon the rear end of the control spool 37 in the rear chamber 39. As a result, the control spool 37 is displaced to the right against the coiled spring 51.

The flow rate Q of the hydraulic liquid under pressure delivered from the pump mechanism 18 increases, as shown in FIG. 5, from zero in proportion to the rotational speed of the engine. The pressure difference described above increases accordingly so that the control spool 37 is further displaced to the right. Therefore the operation characteristics of the flow-control valve 28 is so selected that when the engine reaches an idling speed so that the flow rate of hydraulic liquid under pressure to be delivered to the power steering system reaches a predetermined level, the control spool 37 starts to open the bypass port 34. Then the opening area of the bypass port 34 is gradually increased as the control spool 37 is displaced to the right in response to the increase in flow rate of the hydraulic liquid under pressure delivered from the pump mechanism 18 to the intake port 32 with increase in rotational speed of the engine. As a result, the flow rate of the hydraulic liquid flowing or bypassing from the pressure chamber 38 to the bypass port 34 is increased so that the flow rate $q$ of the hydraulic liquid under pressure to be delivered from the outlet port 41 to the power steering system may be maintained substantially at a constant level.

When the rotational speed of the engine reaches a certain level, for instance, 1,000 r.p.m., the enlarged-diameter portion 49 at the free end of the control rod 48 starts to close the center passage hole 43 of the partition wall member 42 as the control spool 37 is further displaced to the right. As a result, the hydraulic liquid under pressure must flow from the front chamber 38 to the outlet port 41 through the variable-area orifice 50 defined by the orifice groove 44 of the flange 45 of the partition wall member 42 and the enlarged-diameter portion 49 of the control rod 48. As the rotational speed of the engine increases further in excess of 1,000 r.p.m., the control spool 37 is further displaced to the right so that the opening area of the variable-area orifice 50 is gradually reduced. As a result, the control spool 37 is displaced to the right in response to the increase in flow rate of the hydraulic liquid under pressure delivered from the pump mechanism 18. The bypass port 34 is suddenly wide opened with the resultant increase in the flow rate of the bypass flow. Therefore as indicated by the solid-line curve in FIG. 5, the flow rate $q$ of the hydraulic liquid under pressure delivered from the outlet port 41 to the power steering system is gradually decreased with increase in rotational speed of the engine. That is, the flow-control valve 28 exhibits the flow-rate attenuation characteristic.

As described before, this flow-rate attenuation characteristic of the flow-control valve 28 is attained by the variable-area orifice 50 defined by the enlarged-diameter portion 49 at the free end of the control rod 48 and the radial groove 44 cut into the flange 45 of the partition wall member 42. Therefore the flow-rate attenuation characteristic is not adversely affected by the manufacture and assembly tolerances of these parts and the misalignment therebetween. In other words, the fabrication and assembly of these parts may be much simplified and facilitated. The flow-control valve 28 may be easily detached from the pump 10 when the nipple 40 is removed independently of the pump mechanism 18. Therefore one of the partition wall members 42 with the orifice grooves 44 in various configurations as shown in FIG. 4 may be selected and mounted in the pump 10 depending upon the types of the vehicles and power steering systems thereof so that the optimum flow-rate attenuation characteristic or flow-rate characteristic curve $q$ shown in FIG. 5 may be suitably obtained.

What is claimed is:

1. A power steering system adapted to be driven by an engine of a motor vehicle, comprising
a reservoir for hydraulic fluid;
a power steering mechanism;
a pump communicating with said reservoir for supplying hydraulic fluid under pressure to said mechanism;
means forming a hydraulic circuit having a supply branch which connects said pump with said mechanism;
a flow-control valve interposed in said supply branch for controlling the rate of fluid flow to said mechanism, said valve having a fluid outlet port, a chamber upstream of said port and provided with an inlet and with an outlet which communicates with said port, an annular member mounted intermediate said outlet and said port and having an axial bore communicating with said chamber and said port and an axial end face facing away from said chamber and formed with an orifice groove provided with an inner end which communicates with said bore and also with an outer end open to said port, and a valve member slidable in said chamber and having a rod-shaped extension projecting with clearance through said bore and provided adjacent said axial end face with an enlarged-diameter portion dimensioned to substantially block said bore so that, when said valve member slides in a direction in which said portion approaches said axial end face, said portion and said orifice groove together form a variablearea orifice the area of which becomes increasingly smaller as said portion approaches said axial end face whereby the flow of fluid out of said clearance and through said orifice is concomitantly progressively throttled.

2. A system as defined in claim 1, wherein said valve member is a spool valve member provided with lands.

3. A system as defined in claim 1, wherein said bore is a central bore in said annular member.

4. A system as defined in claim 1; and further comprising means interchangeably mounting said annular member intermediate said outlet and said port so that said annular member may be replaced at will with another annular member having a differently configurated orifice groove to thereby change the damping characteristic of said valve.

5. A system as defined in claim 1, wherein said groove is of arcuate cross-section.

6. A system as defined in claim 1, wherein said groove is of polygonal cross-section.

7. A system as defined in claim 1, wherein the cross-section of said groove converges continuously in direction from said axial end face towards said outlet of said chamber.

8. A system as defined in claim 1, wherein the cross-section of said groove converges discontinuously in direction from said axial end face towards said outlet of said chamber.

* * * * *